Aug. 16, 1938.  B. JORGENSEN  2,126,781
MACHINE FOR ASSEMBLING COUNTERS AND UPPERS
Filed March 11, 1937  3 Sheets-Sheet 1

INVENTOR
Bernhardt Jorgensen
By his Attorney
Harlow M. Davis

Aug. 16, 1938.   B. JORGENSEN   2,126,781
MACHINE FOR ASSEMBLING COUNTERS AND UPPERS
Filed March 11, 1937   3 Sheets-Sheet 2
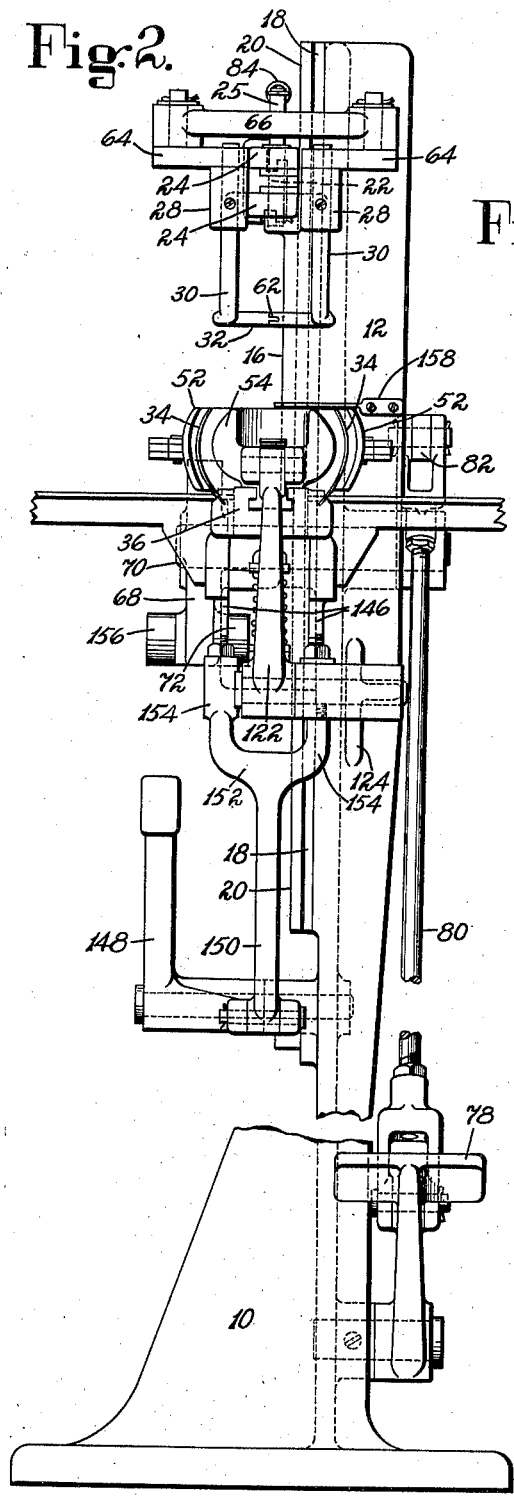
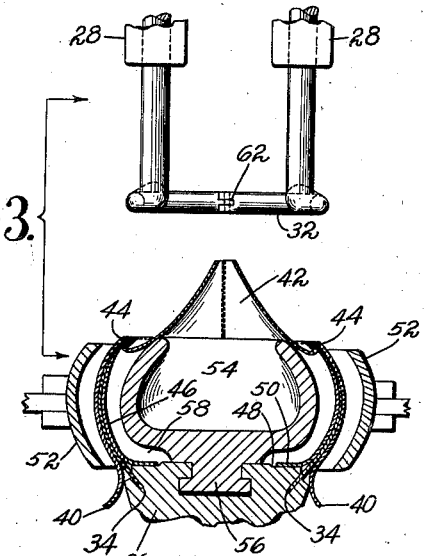
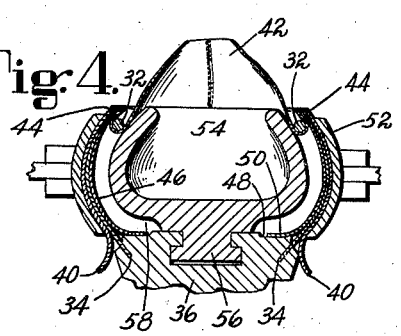
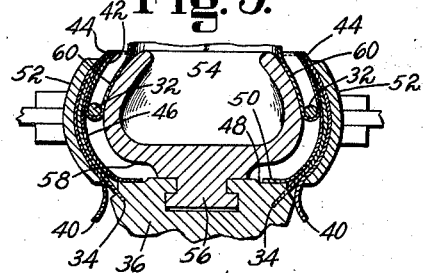

Aug. 16, 1938.   B. JORGENSEN   2,126,781
MACHINE FOR ASSEMBLING COUNTERS AND UPPERS
Filed March 11, 1937   3 Sheets-Sheet 3

INVENTOR
Bernhardt Jorgensen
By his Attorney
Harlow M. Davis

UNITED STATES PATENT OFFICE 2,126,781

MACHINE FOR ASSEMBLING COUNTERS AND UPPERS

Bernhardt Jorgensen, Marblehead, Mass., assignor to United Shoe Machinery Corporation, Paterson, N. J., a corporation of New Jersey Application March 11, 1937, Serial No. 130,340

51 Claims. (Cl. 12—51)

The present invention relates to machines for use in assembling lined uppers and counters and is herein illustrated as embodied in a machine for assembling lined uppers and molded counters provided with sole-attaching flanges.

The accurate positioning of the counter between the lining and upper at the rear portion of a shoe preliminary to the lasting operations is important, whatever type of counter is used, and is extremely important when molded counters are used since it is practically impossible to alter permanently the shape of a molded counter after it has been inserted into an upper and consequently if it is not accurately assembled in the upper the rear part of the upper will not retain the shape of the last after it is removed therefrom.

It is an object of the present invention to provide a machine for use in assembling lined uppers and counters which will accurately position an upper and its counter relatively to each other and permanently secure said parts in assembled position. It is a further object of the invention to provide in an assembling machine means for laying the rear part of the lining smoothly against the inner surface of the counter thereby to obviate the occurrence of unsightly wrinkles such as sometimes occur in the visible portions of shoe linings.

With the above objects in view the present invention in one aspect thereof comprises a machine for assembling lined uppers and counters off the last having means, herein illustrated as an upstanding plate, for supporting a lined upper, said plate being constructed and arranged to embrace a counter and being so formed that the counter fits into it and is positioned by it relatively to the upper supported thereon. For supporting a counter within said plate the illustrated machine is provided with a support or table which is secured to the machine frame. The illustrated table supports the counter in upright position by the bottom of its flange and does not interfere with the positioning of the lining on the inner surface of the counter and the upper surface of the counter flange. For laying the rear part of a shoe lining against the inner surface of a counter the illustrated machine is provided with a wiper for wiping the lining from the top edge of the counter to the bottom edge thereof. To enable the wiper to maintain sufficient tension on the lining to insure a smooth wiping operation the machine is provided with means herein illustrated as an inner form for causing the non-wiped portion of the lining to extend from the wiper in a direction substantially opposite to the direction of operative movement of the wiper, the rear part of the lining having been turned inside out and arranged to extend away from the top edge of the upper before the inner form is advanced into operative position. The inner form causes the lining to embrace the wiper during the wiping operation and creates sufficient frictional resistance to the wiping operation to insure a tension of the lining sufficient to prevent the occurrence of wrinkles during the wiping operation. The machine is provided with novel means for moving the lining wiper heightwise of the supported upper and for successively expanding and contracting the wiper during its heightwise movement in order to cause it to follow the contour of the interior of the counter and also with novel means for further contracting the lining wiper after it has come to the limit of its movement thereby laying the margin of the lining upon the flange of the counter. For securing assembled upper parts together the machine is provided with fastening-inserting means which operate to clench the fastenings against the lining wiper.

A suitable method of assembling lined uppers and counters in conjunction with the operation of the illustrated machine is described and claimed in my copending application for U. S. Letters Patent Serial No. 171,525, filed October 28, 1937, which is a division of the present application. As herein illustrated and described the preferred method of assembling lined uppers and counters consists in positioning a lined upper and a counter with the lining at the rear part of the upper turned inside out and arranged to extend outwardly from the upper, wiping the lining against the inner surface of the counter from the top of the counter to the bottom edge thereof and during the wiping operation causing the non-wiped portion of the lining to extend from the wiping means in a direction substantially opposite to the direction of operative movement of the wiper.

These and other features of the invention will now be described with reference to the accompanying drawings and pointed out in the appended claims.

In the drawings,

Fig. 2 is a front elevation of the machine illustrated in Fig. 1;

Fig. 3 is a sectional elevation taken through the rear portion of an upper supported in the machine illustrating the positions of certain operating parts when the machine is at rest;

Figure 8:
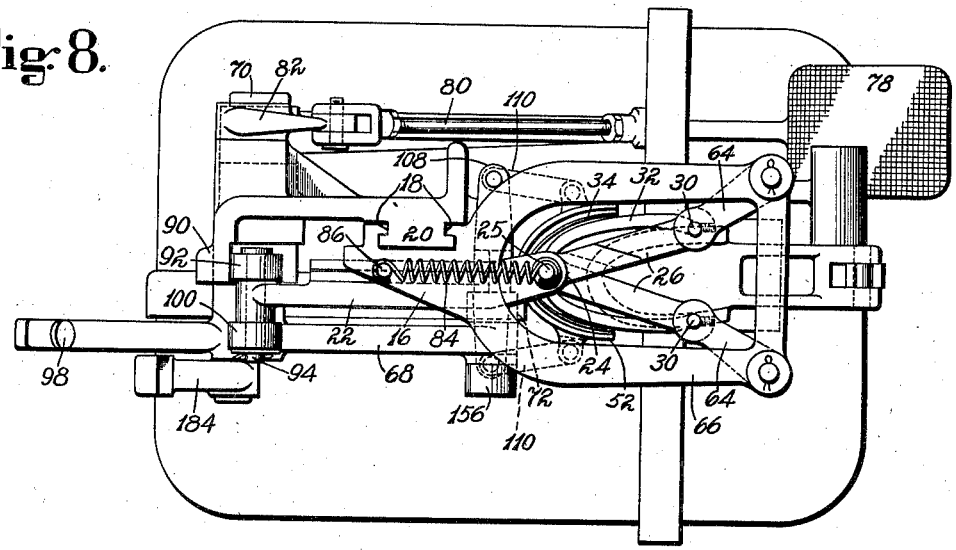
Figure 6:
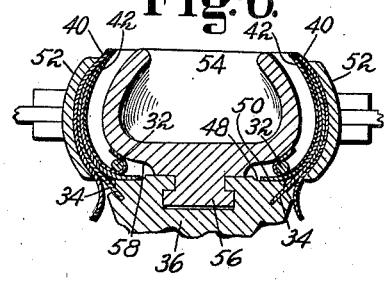
Figure 7:
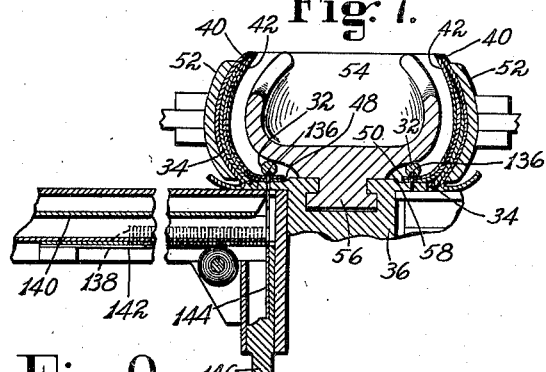

Figs. 4, 5, and 6 are sectional views similar to Fig. 3 showing the operating parts at different stages in the cycle of operations;

Fig. 7 is a sectional view similar to Fig. 6 showing the positions of the parts at the end of the cycle of operations and illustrating in detail part of a staple driving mechanism;

Fig. 8 is a plan view of the machine; and

Figure 9:
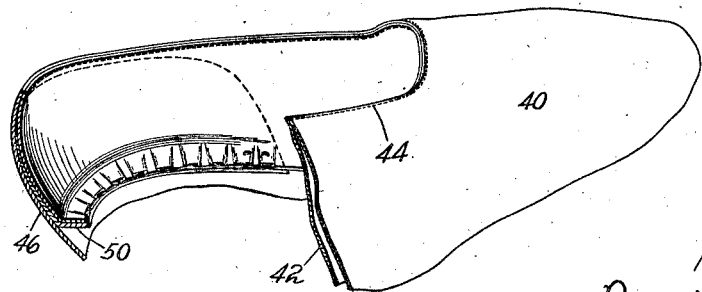

Fig. 9 is a perspective view of an upper in which a counter has been assembled, part of the rear portion of the upper being broken away.

Figure 1:
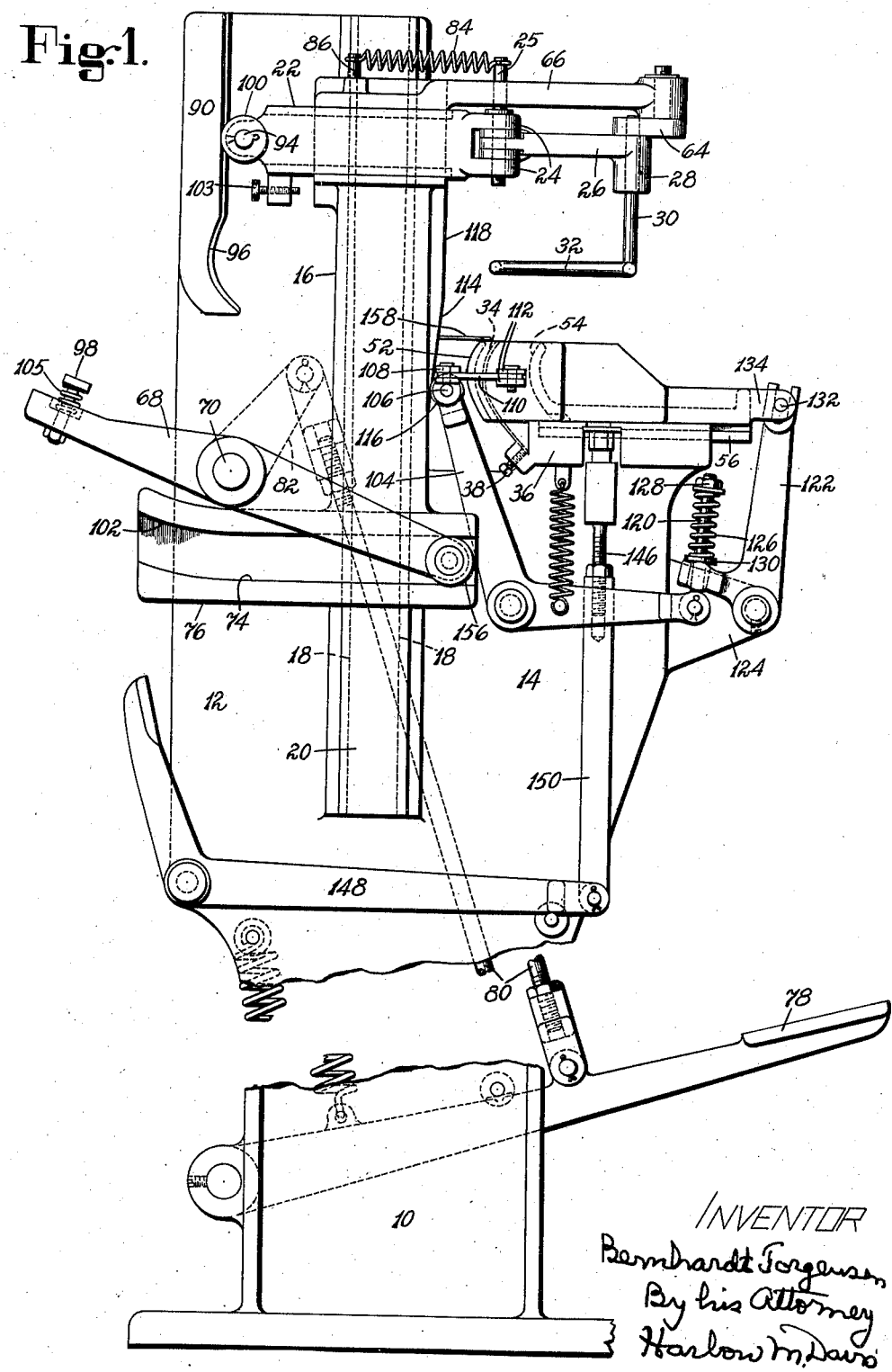
Fig. 1 is a side elevation of an assembling machine embodying the features of the present invention.

Referring to Fig. 1, the illustrated machine comprises a column 10 having at its upper end a head 12 which is provided with a forward extension 14 on which certain operating parts of the machine are located. A carrier member 16 travels in vertical grooves 18 (Fig. 8) in an offset portion 20 at the left side of the head 12. At its upper end the carrier 16 is provided with a transverse T-way within which there is mounted for horizontal sliding movement generally lengthwise of a shoe in the machine a slide 22 which has mounted between forwardly projecting ears 24 and pivoted on a vertical pin 25 a pair of arms 26 having bosses 28 (Fig. 1) at their forward ends provided with vertical holes within which are secured upwardly extending end portions 30 of a generally U-shaped flexible wiper member or bar 32 (Fig. 3) which travels heightwise of an upper in the machine to wipe the lining downwardly against the inner surface of a molded counter.

For supporting a lined upper in position to be operated upon by the wiper bar 32 the illustrated machine is provided with a thin upstanding plate 34 (Fig. 2) which has the contour of the rear portion of a shoe, said plate being supported by its bottom margin in a narrow groove in a table 36 formed in the upper portion of the forward extension 14 of the machine head. The plate 34 is removably secured in the groove in the table by clamping screws one of which is illustrated at 38 in Fig. 1. As illustrated in Fig. 3 the plate 34 is constructed and arranged to support a lined upper, for example the upper 40 illustrated in Fig. 3, by engagement with the adjacent surfaces of the upper 40 and its lining 42 in the region of a sewn seam 44 which unites the top margins of the upper and lining. It will be understood that the generally U-shaped construction of the plate 34 gives it sufficient rigidity to support the upper during the down-wiping of the lining by the wiper bar 32 and permits the use of a supporting plate which is slightly thinner than the upper itself and therefore causes little displacement of the upper parts during the assembling operation. For supporting a flanged counter in upright position, for example the counter 46 illustrated in Fig. 3, the table 36 is provided with a shallow marginal recess or rabbet 48 which has substantially the same curvature as the flange 50 of the counter. The inner surface of the upper-supporting plate 34 provides an abutment against which the outer surface of the body portion of the counter is positioned. It will be understood that the plate 34 holds the counter in position during the downward movement of the wiper bar 32 to wipe the lining 42 against the inner surface of the counter. For backing up the plate 34 during said lining-wiping operation and for shaping the rear portion of the upper the illustrated machine is provided with a rear-part-embracing member or shoe 52 the inner surface of which has a contour complementary to the shape of the outer surface of the rear portion of a shoe. When the heel-embracing member is brought into engagement with the outer surface of the upper 40, as seen in Fig. 4, the rear part of the upper is pressed and held against the outer surface of the supporting plate 34 throughout its entire extent and the supporting plate is positively held against outward flexure during the lining-wiping operation.

In order that there will be sufficient resistance of the lining 42 to the downward wiping operation of the wiper bar 32 to insure that said operation will lay the lining smoothly against the inner surface of the counter and form the lining to the inner contour of the counter without permitting the formation of wrinkles, the lining is turned inside out and arranged to extend generally upwardly from the top margin of the upper, as seen in Fig. 3, and an inner form 54 is provided for engagement with the counter-attaching surface of the lining during the operation of the wiper 32. At the base of the inner form 54 is a T-shaped tongue 56 which is mounted for sliding movement in an undercut groove provided in the table 36 and arranged to extend generally lengthwise of the supported upper. As illustrated in Fig. 3, the tongue 56 and the groove in the table are arranged centrally of the supported upper and therefore position the form 54 in the center of the space enclosed by the inner surface of the counter 46. The contour of the outer surface of the form 54 is such that when said form is in operative position its outer surface is substantially uniformly spaced from the inner surface of the counter throughout the entire extent of the counter. To provide a like space between the lower marginal portion of the form and the upper surface of the flange 50 of the counter the lower marginal portion of the form 54 is cut away, as shown at 58 in Fig. 3. It will be understood that the distance from the outer surface of the form 54 to the inner surface of the supported counter 46 need not be measured precisely. In fact, certain variations due to differences in thickness of counters and linings is inevitable. Generally speaking, the space between the form and the counter should permit the wiper bar 32 to move downwardly through said space with a thickness of lining material at each side of the bar, as illustrated in Fig. 5, but the outer surface of the form should be close enough to the counter to cause a frictional engagement of the non-wiped portion of the lining, for example the upturned portion 60 illustrated in Fig. 5, with the outer surface of the form 54 thereby to create sufficient resistance to the lining-wiping operation to insure a tensioning of the lining during the wiping operation sufficient to cause the lining to be laid smoothly against the counter. As the wiper bar 32 moves downwardly between the form 54 and the counter, the surface of the lining which is exposed in the finished shoe slides about the bottom portion of the wiper bar and creates further resistance to the wiping operation and consequently a relatively small amount of friction between the lining and the form 54 is sufficient to provide the required tension of the lining for the downward wiping operation. In most classes of work a satisfactory lining wiping operation would be performed if the form 54 merely held the lining in wiper-embracing position, as illustrated in Fig. 5, without itself exerting any appreciable frictional action on the lining.

As a wiper bar 32 moves downwardly to perform its wiping operation it is of course necessary for it to expand during the first part of its wiping movement and to contract during the latter part of its wiping movement in order to follow the heightwise curvature of the inner surface of the counter. After the wiper 32 comes to the limit of its downward movement it is further contracted to wipe the bottom margin of the lining from its position in Fig. 6 to its position in Fig. 7 thereby laying the margin of the lining upon the flange of the counter. The required contracting movement of the wiper bar 32 is effected by causing the arms 26 (Fig. 8) which support the wiper by its upturned ends to move toward each other. In order for such swinging movement of the arms 26 to cause a contraction of the wiper throughout the entire extent of the side portions thereof and not merely a movement of the end portions of the wiper bar toward each other the central portion of the wiper bar must have a flexing region on point to insure a contraction of the curved central portion of the wiper bar. In the illustrated machine such a flexing point is provided by forming the wiper bar in two parts and connecting the parts by a hinge 62. For moving the arms 26 toward and away from each other to effect the required contraction and expansion of the wiper bar a pair of links 64 are pivoted to a D-shaped bracket 66 extending from the upper portion of the carrier 16 toward the toe portion of a shoe in the machine, the free ends of said links 64 being pivoted to the end portions of the wiper bar 32 projecting upwardly from the arms 26. As illustrated in Fig. 8, the links 64 converge toward the wiper bar to such an extent that their pivotal connections with the wiper bar are located at all times between lines connecting the pivot point of the arms 26 on the slide 22 to the pivot points of the links 64 on the bracket 66 and consequently movement of the slide 22 toward the end of the bracket 66 causes the wiper bar to contract and at the same time to move bodily toward the forward end of the bracket 66 while movement of said slide in the opposite direction causes the links 64 to move away from each other thereby expanding the wiper bar and moving it bodily away from the end of the bracket 66.

For moving the carrier 16 downwardly in order to move the wiper bar 32 downwardly through the interior of a supported upper the illustrated machine is provided with a rocker arm or lever 68 (Fig. 1) which is secured at one end of a cross shaft 70 journaled in the head 12 and carries at its forward end a roll 72 (Fig. 8) constructed and arranged to travel in a groove 74 (Fig. 1) provided in a crosshead 76 at the lower end of the carrier 16. For turning the lever 68 in a clockwise direction, as seen in Fig. 1, in order to move the carrier downwardly from its position in Fig. 1, the illustrated machine is provided with a treadle 78 which has pivoted thereto a link 80 the upper end of which is pivoted to the end of a short arm 82 which is secured to the cross shaft 70 at the opposite side of the machine head from the lever 68.

During the downward movement of the carrier 16 relatively to a supported upper the wiper bar 32 moves rearwardly of the upper until it has traveled substantially half way from the top margin of the upper to its lasting margin and during the remainder of the downward movement of the carrier the wiper bar moves forwardly of the upper. For effecting the rearward movement of the wiper bar there is provided in the illustrated machine a tension spring 84 one end of which engages a pin 86 projecting upwardly from the top of the carrier 16 and the other end of which engages the upper end of the pin 25 mounted in the ears 24 at the forward end of the slide 22. The extent of the rearward movement of the wiper bar 32 is determined by a stationary vertical cam member 90 (Fig. 1) formed in the head 12 at the left side of its upper portion and arranged to be engaged by a roll 92 (Fig. 8) mounted at the inner end of a headed cross shaft 94 at the rear end of the slide 22. The rearward movement of the wiper bar begins as the roll 92 comes to a curved portion 96 (Fig. 1) of the cam face formed in the member 90. It will be seen that the upper portion of the curved surface 96 extends downwardly and rearwardly and therefore affords corresponding movements of the wiper bar 32 by the combined action of the treadle 78 and the spring 84 while the lower portion of said curved cam face extends forwardly and causes the wiper to move forwardly of the upper during the latter part of its downward movement. It will be understood that the wiper bar is first expanded and then contracted during its downward movement through the upper by the action of the wiper-supporting arms 26, together with the arms 64. For moving the wiper bar forwardly of the upper after the carrier 16 has come to the limit of its downward movement thereby to wipe the bottom margin of the lining inwardly over the upper surface of the flange of the counter a spring-pressed pin 98 at the free end of the lever 68 engages a roll 100 at the outer end of the cross shaft 94 on the slide 22, the engagement of the pin with the roll occurring as said lever comes into a vertical position in the course of its operative movement. During the remainder of the operative movement of said lever after its free end engages the roll 100 the roll 72 on said lever travels in a curved portion 102 of the groove 74 which at that time is concentric to the path of movement of the roll 72 and consequently the roll 72 holds the carrier 16 stationary while the lever advances the slide.

The advancement of the slide 22 by the lever 68 is arrested by the engagement of a stop screw 103 on the slide with the carrier 16. After the advancement of the slide has been thus arrested the lever 68 continues its clockwise movement to operate staple-driving mechanism hereinafter described and during such continued movement of the lever 68 a spring 105 which presses against the pin 98 yields to permit the lever to move relatively to the pin.

For supporting the rear-part-embracing member 52 which holds the upper against the supporting plate 34 during the operation of the wiper bar the illustrated machine is provided with a bell crank lever 104 (Fig. 1) the vertical arm of which has secured to its upper end a crosspin 106 on which there is tightly fitted a crosshead 108 (Fig. 8) which carries between ears at its outer ends swinging links 110 the forward ends of which are pivoted between ears 112 (Fig. 1) projecting outwardly from opposite sides of the member 52. The links 110 swing freely on the crosshead 108, thus permitting the upper-embracing member 52 to locate itself widthwise of an upper in the machine. During the downward movement of the wiper bar 32 from its position in Fig. 1 to its upper-engaging position the member 52 is advanced from its position in Fig. 1 to upper-embracing position by the carrier 16 which has a forwardly inclined cam face 114 (Fig. 1) which engages a roll 116 at the upper end of the vertical arm of the bell crank lever 104. During the movement of the wiper member through the upper the upper-embracing member 52 is held in upper-embracing position by the engagement of the vertical portion 118 of the cam face 114 with the roll 116.

For advancing the inner form 54 into operative position the horizontal arm of the bell crank lever 104 has swiveled at its free end a pin 120 which extends upwardly through an opening in the short horizontal arm of a bell crank lever 122 which is pivoted on a bracket 124 extending forwardly from the machine head. The pin 120 carries a spring 126 which is confined between a nut 128 at the upper end of the pin and a washer 130 which bears against the bell crank lever. The upper end of the vertical arm of the bell crank lever 122 is bifurcated for engagement with a crosspin 132 in a forward extension 134 of the inner form 54. It will be understood that the spring 126 permits the form 54 to be moved forwardly by the downward movement of the wiper member 32 and thus obviates cramping of the hinged portion of the wiper member between the upper-supporting plate 34 and the inner form 54.

For securing together the assembled lining and counter at the forward ends of the counter flanges the illustrated machine is provided with means for driving a preformed staple upwardly through the flange of the counter and the margin of the lining, and the forward portions of the wiper bar 32 in the contracted position of the wiper, as shown in Fig. 7, operate as anvils to clench the ends of the staple against the upper surface of the margin of the lining. It will be seen that the position of the wiper for this purpose is determined by the adjustment of the stop screw 103. The forward portions of the wiper bar have grooves 136 formed therein for the reception of the legs of the staples during the staple-driving operation. For driving the staples, driving means of known form may be provided. The illustrated staple-driving devices are similar to the device disclosed in United States Letters Patent No. 1,441,683, granted January 9, 1923 on an application of Holzhausen. As illustrated in Fig. 7 which illustrates part of one of the stapling devices, a strip of preformed staples 138 is fed through a magazine 140 by a spring-energized flexible band 142 and the end staple of the strip 138 is sheared from the strip and driven by a driving plate 144 secured to a plunger 146. For operating the staple-driving plungers simultaneously the illustrated machine is provided with a bell crank lever 148 (Fig. 1) having a long horizontal arm extending from back to front of the lower portion of the machine head. Pivoted to the forward end of said horizontal arm is a vertical bar 150 having a crosshead 152 (Fig. 2) at its upper end from the opposite ends of which parallel arms 154 extend upwardly and are secured to the threaded lower ends of the plungers 146. For operating the bell crank lever 148 the lever 68 is provided with a roll 156 (Fig. 1) which engages the end of the vertical arm of the bell crank lever 148 during the latter part of the operative movement of the lever 68.

In assembling lined uppers and counters with the aid of the illustrated machine an upper is arranged in upright position on the supporting plate 34 with the upper edge of said plate in engagement with the adjacent surfaces of the upper and lining in the region of the seam which unites the top margins of said parts. The rear part of the lining is turned inside out and arranged to extend upwardly from the top edge of the upper, as illustrated in Fig. 3. A counter the bottom margin of which is flanged inwardly is mounted on the table 36 with its flange positioned on the rabbeted portion of said table. Preferably the inner surface of the counter has a coating of adhesive thereon in order that the lining may be secured to the counter by the operation of the wiper bar 32. The outer surface of the counter, and the upper and lining, have no adhesive thereon as they come to the assembling operation. After the shoe parts have been positioned in the machine as above described the operator centers the back seam of the upper relatively to the supported counter with the aid of a finger 153 (Fig. 2) secured to the machine head, then draws the toe end of the upper toward him in order to hold the rear part of the upper in position on the plate 34. The operator then depresses the treadle 78 thereby moving the carrier 16 downwardly. During the first part of the downward movement of the carrier the cam face 114 bearing against the roll 116 on the bell crank lever 104 swings said lever in a clockwise direction, as seen in Fig. 1, thereby bringing the rear-part-embracing form 52 into engagement with the upper and bringing the inner form 54 into operative position. Further downward movement of the slide 16 after the members 52 and 54 have been brought into position moves the wiper bar 32 downwardly through the space between the inner surface of the counter and the outer surface of the form 54. The path of downward movement of the wiper bar follows the contour of the outer surface of the form 54 and causes the lining to be laid smoothly against the inner surface of the supported counter. The downward movement of the carrier 16 is arrested as the wiper bar 32 reaches its position illustrated in Fig. 6. This occurs when the lever 68 which moves the carrier downwardly has reached a substantially vertical position and the spring-pressed pin 98 on said lever has engaged the roll 100 at the rear end of the slide 22. Further downward movement of the treadle 78 moves the slide 22 forwardly, advancing the wiper bar in a horizontal plane from its position in Fig. 6 to its position in Fig. 7 thereby wiping the bottom margin of the lining against the flange of the counter and positioning the forward portions of the wiper bar in alinement with the staple drivers.

During the latter part of the horizontal movement of the wiper bar the roll 156 on the lever 68 engages the free end of the bell crank lever 148 and drives the staples.

Having thus described my invention, what I claim as new and desire to secure by Letters Patent of the United States is:

1. In a machine for assembling lined uppers and counters, means for supporting a lined upper, means for supporting a counter and positioning it relatively to the supported upper, a wiper for wiping the rear part of the lining against the inner surface of the counter from the top edge of the counter to the bottom edge thereof, and means operating during the wiping operation to cause the non-wiped portion of the lining to extend from the wiper in a direction substantially opposite to the direction of operative movement of the wiper.

2. In a machine for assembling lined uppers and counters, means for supporting a lined upper the lining of which at the rear part of the upper is turned inside out and arranged to extend away from the top edge of the upper, means for supporting a counter and positioning it relatively to the supported upper, a wiper for wiping the rear part of the lining against the inner surface of the counter from the top edge of the counter to the bottom edge thereof, and a form constructed and arranged to be positioned within the rear part of the supported upper for engagement with the unwiped portion of the lining during the wiping operation thereby to create resistance to said wiping operation.

3. In a machine for assembling lined uppers and counters, means for supporting a lined upper the lining of which at the rear part of the upper is turned inside out and arranged to extend away from the top edge of the upper, means for supporting a counter and positioning it relatively to the supported upper, a wiper for wiping the rear part of the lining against the inner surface of the counter from the top edge of the counter to the bottom edge thereof, and a form having the general shape of the rear part of a shoe, said form being constructed and arranged to be positioned within the supported counter with the outer surface of the form uniformly spaced from the inner surface of the counter for engagement with the unwiped portion of the lining during the wiping operation.

4. In a machine for assembling lined uppers and counters, means for supporting a lined upper the lining of which at the rear part of the upper is turned inside out and arranged to extend away from the top edge of the upper, means for supporting a flanged counter and positioning it relatively to the supported upper, a wiper for wiping the rear part of the lining against the inner surface of the counter from the top edge of the counter to the flange thereof, and a form having the general shape of the rear part of the interior of a shoe, said form being constructed and arranged to be positioned within the supported counter with the outer surface of the form uniformly spaced from the inner surface of the counter for engagement with the unwiped portion of the lining during the wiping operation, the bottom of said form being provided with a marginal recess which provides clearance for movement of the wiper member to lay the bottom margin of the lining on the flange of the counter.

5. In a machine for assembling lined uppers and molded counters, means for supporting a lined upper the lining of which at the rear part of the upper is turned inside out and arranged to extend outwardly from the top edge of the upper, a wiper for wiping the rear part of the lining against the inner surface of a molded counter in the upper, a form having the general shape of the rear part of the interior of a shoe, and a frame on which the form is mounted for movement generally lengthwise of the upper to position said form with its outer surface uniformly spaced from the inner surface of the counter for engagement with the non-wiped portion of the lining during the wiping operation.

6. A machine for assembling lined uppers and counters off the last having, in combination, means for wiping the lining at the rear part of an upper against a counter supported in the upper, and means for supporting the rear part of the upper, said supporting means being constructed and arranged to embrace the counter and to position it relatively to the upper.

7. In a machine for assembling lined uppers and molded counters, an upper-supporting plate the inner surface of which has a contour complementary to the contour of the outer surface of a molded counter and provides means for positioning a molded counter lengthwise and widthwise of an upper supported thereon.

8. In a machine for assembling lined uppers and molded counters, a plate for supporting a lined upper, and a frame in which the plate is fixed, the inner surface of the plate being constructed and arranged to position a molded counter lengthwise and widthwise of a supported upper while the upper surface of the frame is constructed and arranged to position the counter heightwise of the upper.

9. In a machine for assembling lined uppers and counters, a plate for supporting a lined upper in upright position by engagement with the inner surfaces of the upper and lining in the region of the seam which secures their top margins together, a rear-part-embracing form for pressing the upper against the supporting plate, a carrier for said form, and connections from the carrier to the form which permit the form to move freely widthwise of a supported upper in order to locate itself relatively to the upper.

10. In a machine for assembling lined uppers and counters, means for supporting the rear portion of an upper in upright position by engagement with the inner surfaces of the upper and lining in the region of the seam whereby the top margins of the upper and lining are secured together, and means for wiping the rear portion of the lining against a counter in the upper.

11. In a machine for assembling lined uppers and counters, means for supporting the rear part of an upper, and a wiper bar for wiping the rear part of the lining heightwise thereof from its top edge to its lasting margin against a counter in the upper.

12. In a machine for assembling lined uppers and counters, means for wiping the rear portion of the lining of a supported upper heightwise thereof against the inner surface of a counter comprising a generally U-shaped wiper, and means for moving the wiper heightwise of the upper following the heightwise curvature of the inner surface of the counter.

13. In a machine for assembling lined uppers and counters, means for supporting a lined upper, means for wiping the lining heightwise thereof against a molded counter in the upper comprising a generally U-shaped wiper bar, means for moving the bar heightwise of the upper, and means for spreading and contracting the bar during its heightwise movement to cause it to follow the contour of the inner surface of the counter.

14. In a machine for assembling lined uppers and counters, means for supporting an upper and a wiper constructed and arranged to wipe the lining heightwise of the upper toward the flange of a molded counter in the upper and thereafter to wipe the margin of the lining against the flange of the counter.

15. In a machine for assembling lined uppers and counters, means for supporting an upper and means for wiping the lining of the supported upper against a molded counter in the upper comprising a wiper bar constructed and arranged to engage the rear portion of the lining, means for moving the wiper bar heightwise of the upper toward the counter flange following the contour of the inner surface of the counter, and means for moving the wiper bar forwardly of the upper and inwardly toward the edge of the flange of the counter wings thereby to flatten the margin of the lining against the flange of the counter.

16. In a machine for assembling lined uppers and counters, means for supporting a lined upper and means for wiping the rear part of the lining against a molded counter in the upper comprising a generally U-shaped wiper member, means for moving said wiper member heightwise of the supported upper toward the flange of the counter, and means operating automatically during such heightwise movement of the wiper member to cause said member to spread during substantially the first half of its downward movement and to contract during the remainder of its heightwise movement thereby to cause the wiper to follow the contour of the inner surface of the counter.

17. In a machine for assembling lined uppers and counters, means for supporting a lined upper and means for wiping the rear part of the lining against a molded counter in the upper comprising a generally U-shaped wiper member, means for moving said wiper member heightwise of the supported upper toward the flange of the counter, means operating automatically during such heightwise movement of the wiper member to cause said member to spread during substantially the first half of its heightwise movement and to contract during the remainder of its heightwise movement thereby to cause the wiper to follow the contour of the inner surface of the counter, and means operating on the wiper member after it has come to the limit of its heightwise movement to move said member forwardly of the upper in the plane of the counter flange.

18. In a machine for assembling lined uppers and counters, means for supporting an upper and means for wiping the rear portion of the lining heightwise of the upper comprising a U-shaped member, and means constructed and arranged to support said member by its ends and to move said ends toward each other as the U-shaped member moves forwardly of the upper and to move said ends from each other as the U-shaped member moves rearwardly of the upper.

19. In a machine for assembling lined uppers and counters, means for supporting an upper and means for wiping the lining heightwise of the upper comprising a generally U-shaped member the ends of which are bent at right angles to the body portion of said member, swinging members to which said end portions are secured, and means operating on said end portions to move said U-shaped member lengthwise of a supported upper and to swing said swinging members thereby to cause the ends of the U-shaped member to move toward each other as said member moves forwardly of the upper and to move from each other as said member moves rearwardly of the upper.

20. In a machine for assembling lined uppers and counters, means for supporting in an upper a generally U-shaped wiper bar for wiping the lining heightwise of the upper, right angular extensions projecting parallel to each other from the ends of said wiper member, a carrier for the lining wiper movable generally heightwise of the supported upper, a slide on the carrier movable generally lengthwise of the supported upper, swinging members on the slide to which the right angular extensions of the lining wiper are secured, and means for causing the side portions of the lining wiper to move toward and from each other as the wiper moves forwardly and rearwardly of the upper.

21. In a machine for assembling lined uppers and counters, a U-shaped wiper member for wiping the lining heightwise of the upper, a carrier for said wiper member, a slide mounted on the carrier for movement generally lengthwise of an upper in the machine, means on the slide for supporting the wiper by its ends, and means on the carrier for causing the ends of the wiper to move toward each other during movement of the slide and wiper forwardly of the upper and for causing the ends of the wiper to move away from each other during movement of the wiper and slide rearwardly of the upper.

22. In a machine for assembling lined uppers and counters, a U-shaped wiper member for wiping the lining heightwise of the upper, a carrier for said wiper member, a slide mounted on the carrier for movement generally lengthwise of an upper in the machine, a pair of swinging members on the slide for supporting the wiper member by its ends, and a pair of swinging members on the carrier constructed and arranged to cause the ends of the wiper member to move toward each other during movement of the wiper and slide forwardly of the upper and to cause the ends of the wiper to move away from each other during movement of the wiper and slide rearwardly of the upper.

23. In a machine for assembling lined uppers and counters, a U-shaped wiper member having a central flexing point for wiping the lining heightwise of the upper, a carrier for said wiper member, a slide mounted on the carrier for movement generally lengthwise of an upper in the machine, means on the slide for supporting the wiper by its ends, and means on the carrier for causing the ends of the wiper to move toward each other during movement of the slide and wiper forwardly of the upper and for causing the ends of the wiper to move away from each other during movement of the wiper and slide rearwardly of the upper.

24. In a machine for assembling lined uppers and counters, a wiper member for wiping the lining heightwise of the upper, a carrier for the wiper member movable generally heightwise of the supported upper, a slide on which the wiper is mounted, said slide being mounted on the carrier for movement generally heightwise of the supported upper, and a stationary cam member constructed and arranged to effect movements of the slide during the movement of the carrier.

25. In a machine for assembling lined uppers and counters, a wiper member for wiping the lining heightwise of the upper, a carrier for the wiper member movable generally heightwise of the supported upper, a slide on which the wiper is mounted, said slide being mounted on the carrier for movement generally lengthwise of the supported upper, means constructed and arranged to effect movements of the slide during the movement of the carrier, and means for moving the slide forwardly of the upper after the carrier has come to rest.

26. In a machine for assembling lined uppers and counters, a wiper member for wiping the lining heightwise of the upper, a carrier for the wiper member movable generally heightwise of the supported upper, a slide on which the wiper is mounted, said slide being mounted on the carrier for movement generally lengthwise of the supported upper, a stationary cam member constructed and arranged to effect movements of the slide during the movement of the carrier, means for moving the slide forwardly of the upper after the carrier has come to rest, and an actuator for moving the carrier and for moving the slide forwardly of the upper after the carrier has come to rest.

27. In a machine for assembling lined uppers and counters, a wiper member for wiping the lining heightwise of the upper, a carrier for the wiper member constructed and arranged for movement heightwise of the upper thereby to advance the wiper member through the interior of the rear portion of the upper from its top edge to its lasting margin, a slide on which the wiper is mounted, said slide being mounted on the carrier for movement generally lengthwise of the upper, and a stationary cam member constructed and arranged to operate during the movement of the carrier to effect movements of the wiper member lengthwise of the upper such that the path of operative movement of the wiper member follows the heightwise curvature of the rear end of the upper.

28. In a machine for assembling lined uppers and counters, a wiper member for wiping the lining heightwise of the upper, a carrier for the wiper member movable generally heightwise of the upper, a lever for moving the carrier, a slide on which the wiper member is mounted, said slide being mounted on the carrier for movement generally lengthwise of the upper, said lever having a lost motion relatively to the carrier after the carrier comes to the limit of its operative movement during which lost motion the lever engages the slide and moves it forwardly of the upper.

29. In a machine for assembling lined uppers and counters, a wiper member for wiping the rear portion of the lining of a shoe upper heightwise of the upper, said lining having first been turned inside out and caused to project outwardly from the upper, an inner form movable lengthwise of the upper to engage the counter-attaching surface of the lining during the operative movement of the wiper member, and means for advancing the form into lining-engaging position and yieldingly holding it in said position during the operation of the wiper member.

30. In a machine for assembling lined uppers and counters, an upstanding plate for supporting an upper in upright position by engagement with the seam which secures together the top margins of the upper and lining, said plate having the general shape of the rear part of a last, a wiper bar for wiping the rear part of the lining heightwise of the upper, said lining having first been withdrawn from the upper, and means for resisting said wiper movement comprising a member the outer surface of which has a heightwise curvature corresponding to the contour of the upper-supporting plate, the width of said member being such that when it is positioned in the heel portion of the supported upper there is sufficient space between the outer surface of said member and the inner surface of said plate to receive the wiper bar and the lining during the lining wiping operation.

31. In a machine for assembling lined uppers and counters, an upstanding plate for supporting an upper in upright position by engagement with the seam which secures together the top margins of the upper and lining, said plate having the general shape of the rear part of a last, a wiper bar for wiping the rear part of the lining heightwise of the upper, said lining having first been withdrawn from the upper, and means for resisting said wiper movement comprising a member the outer surface of which has a heightwise curvature corresponding to the contour of the upper-supporting plate, the width of said member being such that when it is positioned in the heel portion of the supported upper there is sufficient space between the outer surface of said member and the inner surface of said plate to receive the wiper bar and the lining during the lining wiping operation, the lower portion of said member having a marginal recess which provides clearance for horizontal movement of the wiper bar to wipe the lasting margin of the lining against the flange of a counter in the supported upper.

32. In a machine for assembling lined uppers and counters, an outer form constructed and arranged to engage the rear part of a supported upper, a wiper for wiping the rear part of the lining heightwise of the upper, and means for first moving the form into engagement with the upper and thereafter moving the wiper along the inner surface of the rear part of the upper to wipe the lining against a supported counter.

33. In a machine for assembling lined uppers and counters, an upstanding plate for supporting the rear part of an upper in upright position, an outer form constructed and arranged to engage and shape the rear part of a supported upper, a wiper for wiping the rear part of the lining against a supported counter, and an actuator for positively advancing the form and for thereafter moving the lining wiper downwardly through the interior of the rear part of the supported upper and for holding said outer form against the upper during the wiping movement of the lining wiper.

34. In a machine for assembling lined uppers and counters, a plate for supporting the rear part of an upper in upright position, an outer form constructed and arranged to engage and to shape the rear part of a supported upper, a wiper bar for wiping the rear portion of the lining heightwise of the upper against a supported counter, said lining having first been withdrawn from the upper, a member constructed and arranged to engage the counter-attaching surface of the lining during the operative movement of said wiper bar thereby to resist said wiper movement, said member being movable to and from operative position, and an actuator for moving the outer former into engagement with the rear part of the upper and for advancing said member into operative position and for thereafter moving the wiper bar heightwise of the supported upper from top to bottom thereof between the inner surface of the counter and the adjacent surface of said member.

35. In a machine for assembling lined uppers and counters, a plate for supporting the rear part of an upper in upright position, an outer form constructed and arranged to engage and to shape the rear part of a supported upper, a wiper bar for wiping the rear portion of the lining heightwise of the upper against a supported counter, said lining having first been withdrawn from the upper, a member constructed and arranged to engage the counter-attaching surface of the lining during the operative movement of said wiper bar thereby to resist said wiper movement, said member being movable to and from operative position, an actuator for moving the outer former into engagement with the rear part of the upper and for advancing said member into operative position and for thereafter moving the wiper bar heightwise of the supported upper from top to bottom thereof between the inner surface of the counter and the adjacent surface of said member, and means operating during substantially the first half of the operative movement of the wiper bar to cause said bar to move rearwardly of the upper and to cause said bar to move forwardly of the upper during substantially the last half of its operative movement.

36. In a machine for assembling lined uppers and counters, a plate for supporting the rear part of an upper in upright position, an outer form constructed and arranged to engage and to shape the rear part of a supported upper, a wiper bar for wiping the rear portion of the lining heightwise of the upper against a supported counter, said lining having first been withdrawn from the upper, a member constructed and arranged to engage the counter-attaching surface of the lining during the operative movement of said wiper bar thereby to resist said wiper movement, said member being movable to and from operative position, an actuator for moving the outer former into engagement with the rear part of the upper and for advancing said member into operative position and for thereafter moving the wiper bar heightwise of the supported upper from top to bottom thereof between the inner surface of the counter and the adjacent surface of said member, means operating during substantially the first half of the operative movement of the wiper bar to cause said bar to move rearwardly of the upper and to cause said bar to move forwardly of the upper during substantially the last half of its operative movement, and means operating automatically during the movement of the wiper bar rearwardly of the supported upper to cause its side portions to move away from each other, said means operating during movement of the wiper bar forwardly of the upper to cause its side portions to move toward each other.

37. In a machine for assembling lined uppers and counters, means for supporting an upper in upright position comprising an upstanding plate having the general curvature of the periphery of the heel seat portion of a shoe bottom and arranged to support the upper by engagement of the upper edge of the plate with the seam which secures together the top margins of the upper and lining.

38. In a machine for assembling lined uppers and counters, means for supporting an upper in upright position comprising an upstanding plate having the shape of the rear portion of a shoe, said plate being constructed and arranged to be positioned between the upper and its lining.

39. In a machine for assembling lined uppers and counters, means for supporting an upper in upright position comprising an upstanding plate having the shape of the rear portion of a shoe, said plate being constructed and arranged to be positioned between the upper and its lining, and to support the upper by engagement of the upper edge of said plate with the seam which secures together the top margins of the upper and lining.

40. In a machine for assembling lined uppers and counters, a fixed support for an upper in upright position comprising a thin plate the work-engaging portion of which has the shape of the rear portion of a shoe and the top edge of which has the shape of the top edge of the rear portion of an upper, and a member to which the bottom portion of said plate is removably secured.

41. In a machine for assembling lined uppers and molded counters, an upstanding U-shaped plate the outer surface of which is constructed and arranged to engage the inner surface of an upper and the inner surface of which is constructed to engage the outer surface of a molded counter the upper edge of said plate having the same shape as the upper edge of the rear portion of a shoe.

42. In a machine for assembling lined uppers and counters, means for supporting an upper in upright position, and means for supporting a molded counter in predetermined heightwise relation to the supported upper by engagement with the bottom face only of the flange of the counter.

43. In a machine for assembling lined uppers and counters, an upstanding plate for supporting an upper in upright position, and a member to which said plate is secured, said member having a counter-supporting surface whereby a molded counter is supported in predetermined heightwise relation to the upper by engagement with the bottom face only of the counter flange.

44. In a machine for assembling lined uppers and counters, a wiper member for wiping the lining heightwise of the upper, a carrier for the wiper member movable generally heightwise of a supported upper, a slide on which the wiper is mounted, fastening-inserting means for securing upper parts in assembled position, and an actuator for the carrier having a lost motion relatively to the carrier after the carrier has come to the limit of its advancement, said actuator being constructed and arranged to operate the slide and the fastening-inserting means during its lost motion.

45. In a machine for assembling lined uppers and counters, a lining wiper, a carrier therefor movable generally heightwise of a supported upper, a wiper-supporting slide on the carrier, fastening-inserting means for securing together assembled upper parts, and an actuator for operating the carrier, the slide and the fastening-inserting means in predetermined time relation to each other.

46. In a machine for assembling lined uppers and counters, a wiper member for wiping the lining of a shoe upper heightwise of the upper toward its lasting margin, and fastening-inserting means for securing assembled upper parts together, said wiper member serving to clench the fastenings against the inner surface of the lining.

47. In a machine for assembling lined uppers and flanged counters, a U-shaped wiper member for wiping the lining of a shoe upper heightwise of the upper from its top margin to the counter flange and for wiping the bottom margin of the lining inwardly over said flange, and staple-inserting devices at opposite sides of the supported upper for securing the lining to the flange of the counter, said wiper member serving as an anvil to clench the staples against the lining.

48. In a machine for assembling lined uppers and counters, a wiper member for wiping the lining of a shoe upper heightwise of the upper toward its lasting margin and inwardly against the flange of a molded counter in the upper, fastening-inserting means for securing the lining to the flange of the counter, said wiper member serving to clench the fastenings against the inner surface of the counter, and means for positioning the wiper member in position to clench the fastenings at the end of its wiping movement.

49. In a machine for assembling lined uppers and counters, a wiper member for wiping the lining of a shoe upper heightwise of the upper toward the flange of a counter mounted thereon and inwardly over the flange of the counter, fastening-inserting means for securing together the flange of the counter and the lining, a common actuator for the wiper and the fastening-inserting means, means for arresting the wiper member in a position such that said member is positioned in alinement with the fastening-inserting means and provides an anvil to clench the fastenings against the inner surface of the lining, and yielding connections between the actuator and the wiper permitting further movement of the actuator after the wiper has come to rest to drive and clench the fastenings.

50. In a machine for assembling lined uppers and flanged counters, a wiper member for wiping the lining of a shoe upper heightwise of the upper from its top margin to the counter flange and inwardly against said flange, a staple-inserting device for securing the lining to the flange of the counter, said wiper member serving as an anvil to clench the staple against the lining, and a non-yielding member for holding the wiper against movement in the direction in which the staple is driven.

51. In a machine for assembling lined uppers and flanged counters, means for supporting a lined upper the lining of which at the rear part of the upper is turned inside out and arranged to extend outwardly from the top edge of the upper, a wiper member for wiping the lining heightwise of the upper from its top margin at the counter flange and inwardly against said flange, a form having the general shape of the rear part of a shoe and arranged to engage the counter-attaching surface of the lining and to cause the lining to embrace the wiper, and a staple-inserting device for securing the lining to the flange of the counter, said wiper member serving as an anvil to clench the staple against the lining while said form holds the wiper member from movement in the direction in which the staple is driven.

BERNHARDT JORGENSEN.